United States Patent [19]

Boje et al.

[11] 4,172,587
[45] Oct. 30, 1979

[54] FLAME CUTTING MACHINE

[75] Inventors: Jürgen Boje, Frankfurt am Main; Horst Bratengeier, Neu-Isenburg, both of Fed. Rep. of Germany

[73] Assignee: Messer Griesheim GmbH, Frankfurt am Main, Fed. Rep. of Germany

[21] Appl. No.: 938,912

[22] Filed: Sep. 1, 1978

[30] Foreign Application Priority Data

Sep. 14, 1977 [DE] Fed. Rep. of Germany ....... 2741258

[51] Int. Cl.² .............................................. B23K 7/10
[52] U.S. Cl. ...................................... 266/60; 409/128
[58] Field of Search .......................... 266/60; 90/62 A

[56] References Cited
U.S. PATENT DOCUMENTS

| 2,997,593 | 8/1961 | King | 266/60 |
|---|---|---|---|
| 3,037,888 | 6/1962 | Lobosco et al. | 266/60 |
| 3,124,691 | 3/1964 | Brouwer | 266/60 |
| 3,479,513 | 11/1969 | Simpson et al. | 266/60 |
| 3,704,373 | 11/1972 | Bardwell et al. | 266/60 |
| 3,812,412 | 5/1974 | Hahn et al. | 266/60 |
| 4,072,301 | 2/1978 | Brouwer | 266/60 |

*Primary Examiner*—W. Stallard
*Attorney, Agent, or Firm*—Connolly and Hutz

[57] ABSTRACT

A flame cutting machine includes a unit which photoelectrically scans a line curve or edge with at least one scanning beam receiver and with the output signals conducted to a leveling motor connected to a component analyzer for controlling two coordinate motors and with the scanning beam receiver and the leveling motor and the component analyzer mechanically in direct connection with one another.

4 Claims, 3 Drawing Figures

FLAME CUTTING MACHINE

BACKGROUND OF INVENTION

The invention is concerned with a cutting machine, particularly, a flame cutting machine, with a unit which photoelectrically scans a line curve or edge, which has at least one scanning beam receiver, the output signals of which can be conducted to a leveling motor whereby the leveling motor is connected with a component analyzer for controlling two coordinate motors.

In the case of cutting machines of the above mentioned type which have up to now become known, the scanning beam receivers are placed in a scanning head which, depending upon the output signals of the scanning beam receivers, is adjusted, by means of the leveling motor, in a direction tangent to the line curve or edge to be scanned.

With the known designs, a gear unit is thus required between the leveling motor and the scanning head drive since the leveling motor has too small a starting torque for moving the mass of the scanning head within the shortest possible reaction time. An increase in the motor's starting torque is possible by chosing an accordingly larger motor, but this has the disadvantage that the follow-up speed (scanning speed) cannot, in view of the more sluggish control action of a larger motor, be selected so as to be suitably high. It is however, a constant requirement in the art to bring cutting machines with photoelectric copy control devices into usage with which continuously higher scanning speeds are attainable, which in view of new cutting processes (laser, water plasma), lie far above the speed of 6 m/min which is adequate for flame cutting. These increased demands upon the scanning speed require special measures at the appropriate control devices in the areas of their control speed and control accuracy.

SUMMARY OF INVENTION

The object of the invention is, therefore, to achieve a cutting machine of the above type by means of which high scanning speeds are obtained with high follow-up accuracy and high reaction capability of the control system.

In order to solve this problem it is proposed that the scanning beam receivers, the leveling motor and the component analyzer be directly connected, mechanically, with one another. This measure has the result that the scanning beam receivers must be set, solely by the leveling motor in a direction tangent to the line curve or edge to be scanned. The simultaneous turning of the scanning head up to now required is no longer necessary. In view of the smaller mass to be rotated, it is thus possible to undertake the adjustment of the photoresistor and the component analyzer without a gear unit and with minimal motor starting torques. Because of the smaller starting torques which have become possible, it is therefore possible to install motors which have maximal reaction speeds as well as starting and slow-down times under conditions of minimum load. This is of particular advantage in view of the therewith attainable higher control accuracy at higher scanning speeds (>12 m/min).

An especially simple and practical construction of the control system results if the scanning beam receiver is attached onto a disc type printed circuit which is connected at one end of the shaft of a component analyzer designed as a sine-cosine potentiometer, the other end of the shaft being connected with a direct current shunt-wound motor of low load.

The direct current motor thus preferably has a load of about 5 watts and starting and slow-down times in the range of magnitude of 5 seconds and up.

THE DRAWINGS

DETAILED DESCRIPTION

Figure 1:
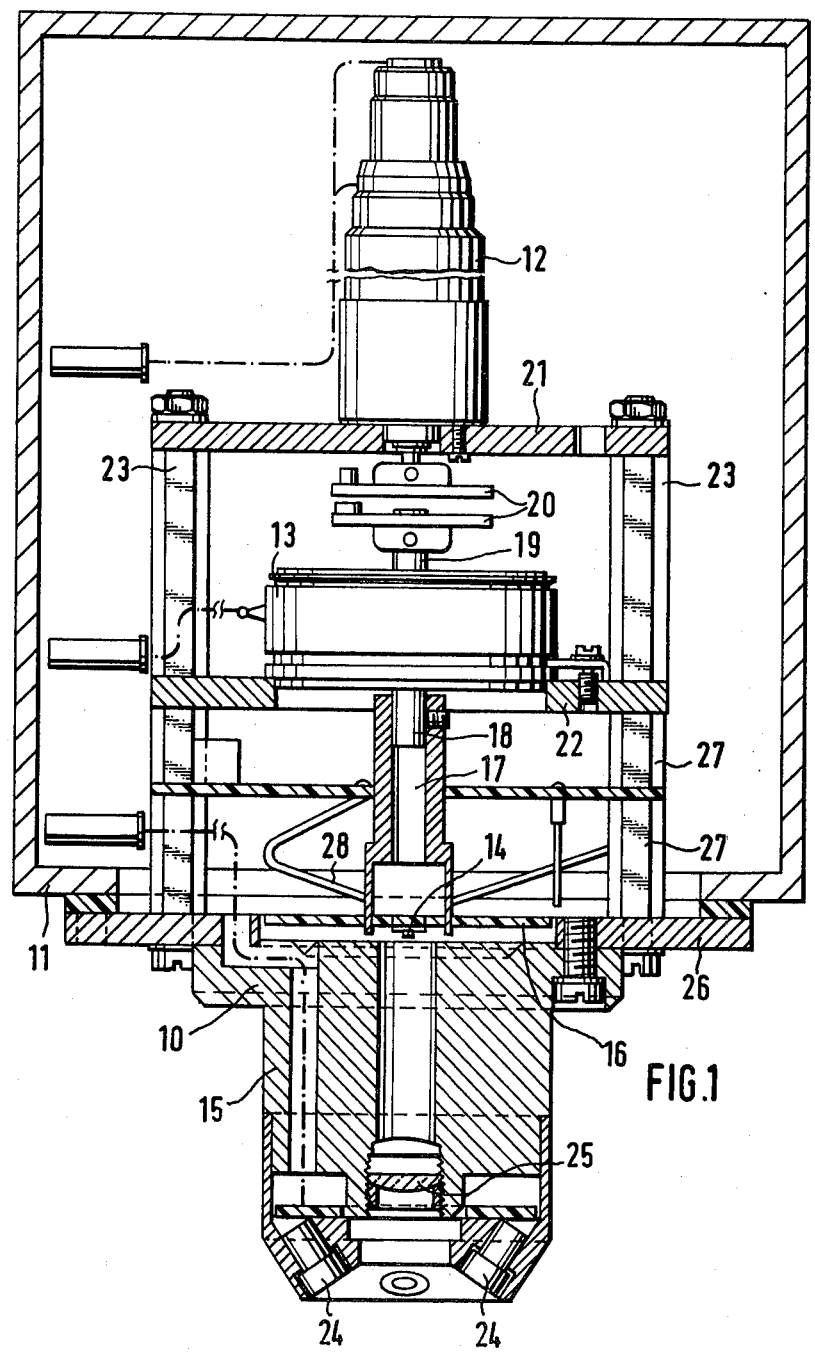
FIG. 1 is a cross-sectional view of a scanning unit in accordance with the invention.

As can be seen from FIG. 1, the scanning unit 10 is inserted as an assembled unit into a schematically represented housing 11. The scanning unit consists essentially of the leveling motor 12, the component analyzer 13 which is designed as a sine-cosine potentiometer, the scanning beam receiver 14 as well as an illuminating optical head 15. According to the invention, the scanning beam receiver 14, the leveling motor 12 and the component analyzer 13 are mechanically in direct connection with one another. The scanning beam receiver 14 is, therewith, preferably attached onto a printed circuit designed as a disc 16 and which is connected with one end of the shaft of the sin-cos. potentiometer 13 by means of a piece of tubing 17. The other end of the shaft 19 of the potentiometer is connected with the motor 12 via a coupling 20. The mechanical mounting of the parts onto one another occurs by means of the mounting plates 21, 22 which are connected with each other and kept apart by means of the hexagonal bolts 23. The head 15 which contains the illuminating means (lamps) 24 as well as a magnifying lens 25 is attached to a plate 26 which is connected with the plate 22 by means of the hexagonal bolts 27. The scanning beam receiver is preferably designed as a phototransistor. However, other types of scanning beam receivers can, of course, be advantageously inserted. The sin-cos. potentiometer is preferably made of conductive plastic which is particularly advantageous with respect to service life.

The phototransistor 14 is attached onto the printed circuit 16 and is connected to conductive tracks which are contacted by the receiving slipring contacts 28.

Figures 2, 3:
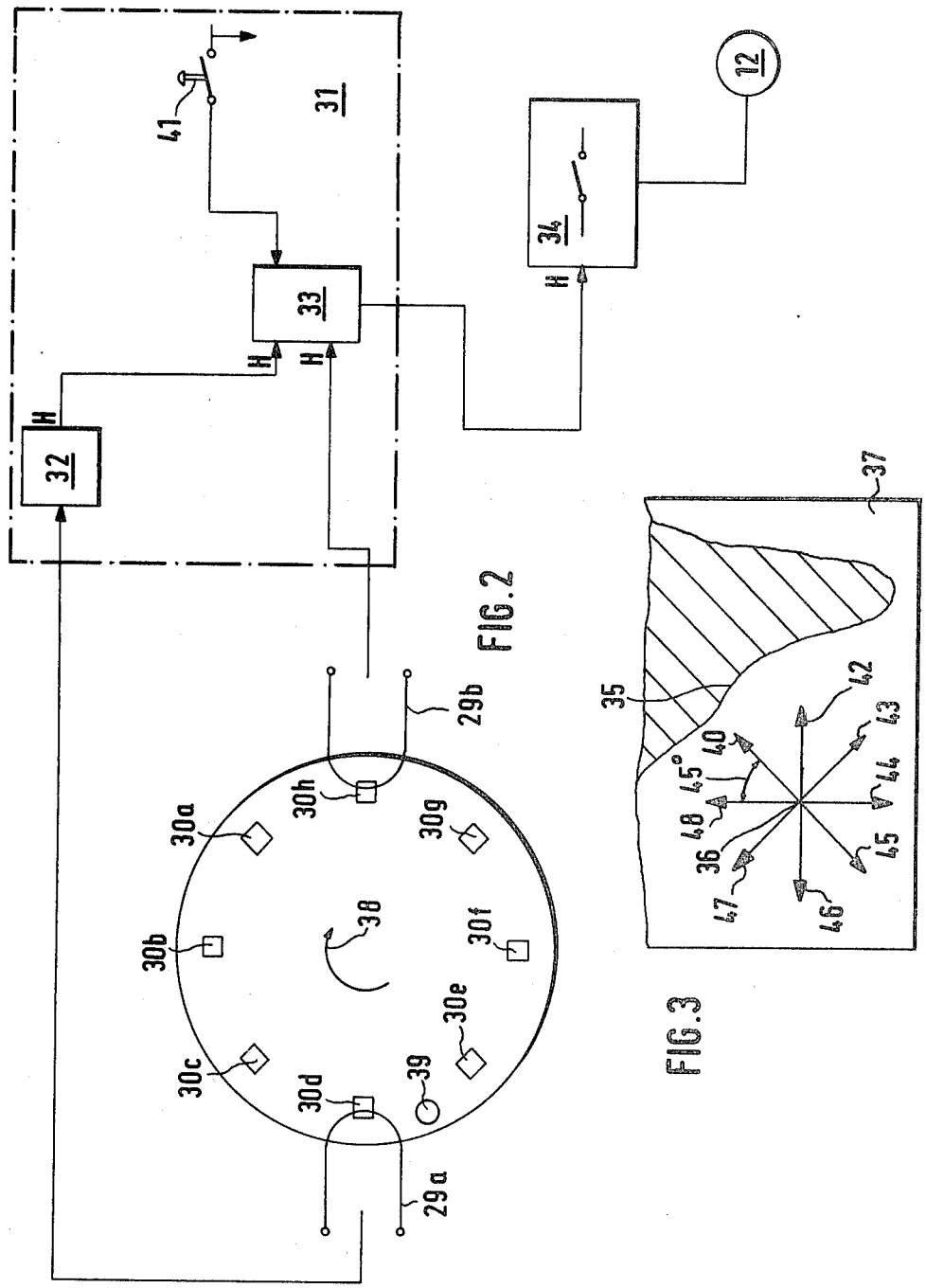
FIG. 2 is a detail illustration of the printed circuit according to FIG. 1 with related feed control system.
FIG. 3 is a drawing pattern.

As is shown especially in FIG. 2, contactable impulse markings 30 are provided, according to a further proposal of the invention, on the disc 16 by means of sliders 29. The sliders 29 and markings 30 are thereby connected with the leveling motor 12 via an impulse stage, given the reference numeral 31, in its entirety, which serves to select the direction of feed of the cutting machine. In the illustrated embodiment, the impulse stage 31 has two flip-flop components 32, 33, whereby the output of the flip-flop 33 is associated with an on-off switch 34 for the motor. The functioning of the mechanism for selecting the direction of cut according to FIG. 2 is explained below in connecton with FIG. 3.

An edge to be scanned is schematically marked 35 in FIG. 3. In the starting position, the scanning head is, for example, at the starting position labeled 36 in FIG. 3; in other words, over the white area of the pattern 37. At the beginning of the cutting direction selection process, the machine is first made ready for use, and then, a steady rotation of the motor 12 is effected by closing the contact 34, as a result of which the disc 16 rotates in the direction of the arrow 38. When the zero mark 39 is reached, an impulse is delivered to the flip-flop 32 via the slider 29 as a result of which the latter is set on "high". As a result of further rotation of the disc 16 in the direction of the arrow 38, an impulse is delivered, via the slider 29, to the flip-flop 33, whereupon this impulse together with the impulse from the flip-flop 32 is carried through and the on-off switch is opened, so that the motor 12 stops. Since the motor 12 is mechanically connected with the sin-cos. potentiometer 13, voltages now queue up at the output of the potentiometer 13 which cause the coordinate motors of the cutting machine to move in such a way that the scanning head and the tool which is mechanically or electrically coupled with it is moved in the direction of the arrow 40 to the contour 35 to be scanned. The direction 40 is also labeled as the direction of cut. In the illustrated design of FIG. 3, the markings 39 and 30a are so arranged with respect to the sliders 29a and 29b that the direction of cut 40 occurs at 45 degrees from the vertical. Depending upon the drawn contour of the template to be scanned it might be desirable to select other scanning mechanisms. It is hereto proposed, according to the invention, that a reset impulse be delivered, via the key 41, to the flip-flop 33 whereupon the flip-flop 33 is switched to "low" and the switch 34 is closed. As a result, the motor 12 rotates so long until a new impulse (high) is delivered, via the slider 29b and the marking 30b, to the flip-flop 33, whereupon the latter is again switched over to the "high" condition. The switch 34 is opened again, the motor 12 remains stopped and the machine and scanning head are now moved in the direction of cut 42 because of the setting of the sin-cos. potentiometer. By repeated pressing of the key 41 and the markings 30c–30h which become activated, the cutting directions 43–48 are thereby successively attainable.

In the above described embodiment, it is assumed that the initial direction of cut 40 always occurs at an angle of 45 degrees. By appropriate variation and modification of the marking 39 with respect to the markings 30a–30h, it is naturally possible to obtain another direction of cut at the onset. Beyond this, it is, of course, possible, by changing the distance as well as the number of the markings, to program a multiplicity of cutting directions which can be recalled through the impulse stage by actuating the impulse switch 41. In this connection, it can still be pointed out that after the scanning head has reached the contour 35 to be scanned the scanning beam receiver 14 is put into use by means of a known circuit not illustrated in detail and that its output signals are only recalled by a rotary shift of the motor 12 and therefore of the sin-cos. potentiometer which serves to control the coordinate motors.

What is claimed is:

1. In a cutting machine, especially a flame cutting machine, having a unit which photoelectrically scans a line curve or edge, and which has at least one scanning beam receiver, the output signals of which can be conducted to a leveling motor whereby the leveling motor is connected with a component analyzer for controlling two coordinate motors, the improvement being said scanning beam receiver and said leveling motor and said component analyzer being mechanically in direct connection with one another.

2. Cutting machine according to claim 1, characterized therein that said scanning beam receiver is attached onto a disc type printed circuit, said printed circuit being connected to one end of the shaft of said component analyzer, said component analyzer being designed as a sine-cosine potentiometer, and the other end of said shaft being connected with a direct current shunt-wound motor of low load capacity.

3. Cutting machine according to claim 2, characterized therein that contactable impulse markings are provided by means of sliders, and said sliders and said markings being connected with said leveling motor via an impulse stage which serves for selecting the direction of cut.

4. Cutting machine according to claim 1, characterized therein that contactable impulse markings are provided by means of sliders, and said sliders and said markings being connected with said leveling motor via an impulse stage which served for selecting the direction of cut.

* * * * *